(12) United States Patent
Qi et al.

(10) Patent No.: US 11,368,220 B2
(45) Date of Patent: Jun. 21, 2022

(54) BANDWIDTH SCHEDULING METHOD AND APPARATUS

(71) Applicant: HUAWEI TECHNOLOGIES CO., LTD., Shenzhen (CN)

(72) Inventors: Jiang Qi, Shanghai (CN); Yanchun Wang, Shanghai (CN); Ziqiang Wang, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 17/163,747

(22) Filed: Feb. 1, 2021

(65) Prior Publication Data
US 2021/0152246 A1 May 20, 2021

Related U.S. Application Data

(63) Continuation of application No. PCT/CN2019/098714, filed on Jul. 31, 2019.

(30) Foreign Application Priority Data

Aug. 3, 2018 (CN) .......................... 201810880195.1

(51) Int. Cl.
*H04B 10/2575* (2013.01)
*H04B 10/27* (2013.01)
*H04W 72/12* (2009.01)

(52) U.S. Cl.
CPC ......... *H04B 10/2575* (2013.01); *H04B 10/27* (2013.01); *H04W 72/1236* (2013.01)

(58) Field of Classification Search
CPC ..................... H04B 10/2575; H04B 10/27; H04W 72/1236

(Continued)

(56) References Cited

U.S. PATENT DOCUMENTS

2013/0028113 A1* 1/2013 Zhu .................. H04W 24/02 370/252
2015/0141032 A1* 5/2015 Aydin ................ H04W 72/085 455/452.2

(Continued)

FOREIGN PATENT DOCUMENTS

CN 101039214 A 9/2007
CN 101330711 A 12/2008

(Continued)

OTHER PUBLICATIONS

Ha Vu Nguyen et al. "Joint Coordinated Beamforming and Admission Control for Fronthaul Constrained Cloud-RANs." 2014 IEEE Global Communications Conference. Dec. 1, 2014. pp. 4054-4059. XP055831322.

(Continued)

*Primary Examiner* — Dalzid E Singh
(74) *Attorney, Agent, or Firm* — Maier & Maier, PLLC

(57) ABSTRACT

The embodiments provide a bandwidth scheduling method and an apparatus to resolve a problem in the prior art that a transmission delay is relatively large and user experience is relatively poor when a baseband unit and a radio remote unit are networked by using a passive optical network. The method includes: allocating, by a baseband unit, radio resources used for data transmission between N first radio frequency units and a terminal to the N first radio frequency units connected to the baseband unit, where N is an integer greater than 0; and then allocating, by the baseband unit based on the radio resources of the N first radio frequency units, bandwidth resources used for data transmission between the baseband unit and the N first radio frequency units to the N first radio frequency units.

19 Claims, 4 Drawing Sheets

(58) Field of Classification Search
USPC .......................................................... 398/116
See application file for complete search history.

(56) References Cited

U.S. PATENT DOCUMENTS

2016/0295572 A1    10/2016  Hahn et al.
2018/0014312 A1*    1/2018  Ezaki ................ H04W 72/1252
2018/0076914 A1*    3/2018  Zhou .................. H04Q 11/0067

FOREIGN PATENT DOCUMENTS

| CN | 106535255 A  | 3/2017 |
| JP | 2015142189 A | 8/2015 |
| WO | 2015049013 A1 | 4/2015 |

OTHER PUBLICATIONS

International Telecommunication Union. "Series G: Transmission Systems and Media, Digital Systems and Networks Digital sections and digital line system—Optical line systems for local and access networks. Gigabit-capable passive optical networks(G-PON): Transmission convergence layer specification." ITU-T G.984.3. Jan. 2014. 170 pages.

* cited by examiner

BANDWIDTH SCHEDULING METHOD AND APPARATUS

CROSS-REFERENCE TO RELATED APPLICATIONS

This application is a continuation of International Application No. PCT/CN2019/098714, filed on Jul. 31, 2019, which claims priority to Chinese Patent Application No. 201810880195.1, filed on Aug. 3, 2018. The disclosures of the aforementioned applications are hereby incorporated by reference in their entireties.

TECHNICAL FIELD

The embodiments relate to the field of communications technologies, and in particular, to a bandwidth scheduling method and an apparatus.

BACKGROUND

Currently, a distributed base station is becoming a mainstream mode of a base station device. A baseband processing unit or base band unit (BBU) and a radio remote unit (RRU) are connected through an optical fiber. One BBU may support a plurality of RRUs. To reduce the usage of optical fibers, distributed base stations can be deployed with reference to a passive optical network (PON) network architecture.

If the base station is deployed based on the PON network architecture, for a process in which the BBU performs bandwidth scheduling on the RRU, refer to a process in which an optical line terminal (OLT) performs bandwidth scheduling on an optical network unit (ONU). A process in which the OLT performs bandwidth scheduling on ONUs is as follows: the ONUs report buffer information to the OLT, and the OLT determines a bandwidth resource required by each ONU based on the buffer information reported by the ONU and allocates the required bandwidth resource to the ONU. Therefore, a process in which the BBU performs bandwidth scheduling on RRUs may be as follows: the RRUs may report bandwidth demands to the BBU, and the BBU allocates a bandwidth resource to each RRU based on the bandwidth demand of the RRU. However, bandwidth resources of the PON network are limited. When the BBU is connected to a relatively large quantity of RRUs, or there are a relatively large quantity of UE services provided by the RRUs, the bandwidth resources of the PON network may be insufficient. Consequently, some RRUs cannot obtain bandwidth scheduling, a transmission delay of the RRUs is relatively long, and user experience is affected.

SUMMARY

The embodiments provide a bandwidth scheduling method and an apparatus, to resolve a problem in the prior art that a transmission delay is relatively large and user experience is relatively poor when a baseband processing unit or base band unit (BBU) and radio remote unit (RRU) are networked by using a passive optical network (PON) network.

According to a first aspect, the embodiments provide a bandwidth scheduling method. The method includes: allocating, by a BBU, radio resources used for data transmission between N first radio frequency units and a terminal to the N first radio frequency units connected to the baseband unit, where N is an integer greater than 0; and then allocating, by the BBU on the radio resources of the N first radio frequency units, bandwidth resources used for data transmission between the baseband unit and the N first radio frequency units to the N first radio frequency units. In this embodiment, the BBU allocates a radio resource to a radio frequency unit. A bandwidth demand amount of the radio frequency unit may be determined by a data amount transmitted by the radio frequency unit, and a radio resource of the radio frequency unit may determine a data amount that can be transmitted by the radio frequency unit. Therefore, the BBU may control the bandwidth demand amount of the radio frequency unit by allocating the radio resource to the radio frequency unit. In this way, a sum of bandwidth demand amounts of all the radio frequency units may be controlled within a total amount of bandwidth resources of the BBU, so that the total amount of bandwidth resources of the BBU can meet the bandwidth demand amounts of the radio frequency units. Because the total amount of bandwidth resources of the BBU can meet the bandwidth demand amounts of the radio frequency units, the radio frequency unit does not form a buffer when the radio frequency unit cannot obtain bandwidth scheduling, so that a transmission delay of the radio frequency unit can be reduced. In addition, the BBU controls the bandwidth demand amount of the radio frequency unit by allocating a radio resource to the radio frequency unit, and then allocates a bandwidth resource to the radio frequency unit based on the bandwidth demand amount of the radio frequency unit. In this way, a transmission delay can be reduced, and the radio frequency units can further share a bandwidth resource, thereby improving bandwidth utilization.

In a possible implementation, the BBU may determine bandwidth demand amounts of the N first radio frequency units based on the radio resources of the N first radio frequency units. The BBU may allocate the bandwidth resource to the $N^{th}$ first radio frequency unit based on the bandwidth demand amounts of the $N^{th}$ first radio frequency unit. In the foregoing implementation, because the bandwidth demand amount of the radio frequency unit may depend on the data amount transmitted by the radio frequency unit, and the data amount that can be transmitted by the radio frequency unit may depend on the radio resource of the radio frequency unit, so that the baseband unit can accurately determine the bandwidth demand amount of the radio frequency unit based on the radio resource of the radio frequency unit, thereby improving bandwidth utilization.

In a possible implementation, if a sum of the bandwidth demand amounts of the N first radio frequency units is not greater than a total amount of bandwidth resources of the baseband unit, allocating, by the BBU, a bandwidth resource satisfying the bandwidth demand amounts to the $N^{th}$ first radio frequency unit; or if a sum of the bandwidth demand amounts of the N first radio frequency units is greater than a total amount of bandwidth resources of the baseband unit, reducing, by the BBU, the radio resources of the $N^{th}$ first radio frequency unit according to a preset rule, and allocating a bandwidth resource to the $N^{th}$ first radio frequency unit based on radio resources of the $N^{th}$ first radio frequency unit obtained after the reduction. In the foregoing implementation, when bandwidth resources of the BBU are insufficient, a bandwidth demand of the radio frequency unit is reduced by reducing radio resources allocated to the radio frequency unit, then the total amount of bandwidth resources of the BBU can meet a bandwidth demand of each radio frequency unit, so that the radio frequency unit can obtain bandwidth scheduling. In this manner, the radio frequency unit does not form a buffer when the radio frequency unit cannot obtain bandwidth scheduling, thereby reducing the transmission delay of the radio frequency unit.

In a possible implementation, the BBU may reduce the radio resources of the N first radio frequency units by a first quantity of radio resources; or the BBU may reduce radio resources of all user services provided by the $N^{th}$ first radio frequency unit by a second quantity of radio resources; or for each user service provided by the $N^{th}$ first radio frequency unit, the BBU may reduce radio resources of the user service by a third quantity of radio resources based on a priority of the user service. In the foregoing implementation, because the bandwidth demand amount of the radio frequency unit decreases as the radio resource decreases, the BBU allocates the bandwidth resource to the radio frequency unit based on the bandwidth demand amount of the radio frequency unit obtained after the decrease, so that a sum of bandwidth demand amounts of all radio frequency units is not greater than the total amount of bandwidth resources of the BBU. In this manner, the radio frequency unit does not form a buffer when the radio frequency unit cannot obtain bandwidth scheduling, thereby reducing the transmission delay of the radio frequency unit. In addition, when reducing the radio resources of the radio frequency unit, the BBU considers a priority of a user service, so that a relatively small quantity of radio resources of a user service with a relatively high priority may be reduced, or radio resources of a user service with a relatively high priority may not be reduced. When the bandwidth resources of the baseband unit are insufficient, communication quality of the user service with a relatively high priority may be preferentially ensured. In this manner, impact caused by insufficient bandwidth resources of the BBU to a user can be reduced.

In a possible implementation, the BBU may allocate, for all user services provided by the $N^{th}$ first radio frequency unit, the radio resources used for data transmission between the N first radio frequency units and the terminal to the $N^{th}$ first radio frequency unit. In the foregoing implementation, the BBU may allocate a radio resource for a user service provided by the radio frequency unit, so that communication quality of the user service can be better ensured, thereby improving user experience.

In a possible implementation, when determining that a second radio frequency unit is ready for access, the BBU may control terminals served by the N first radio frequency units to suspend uplink data transmission; then the BBU accesses the second radio frequency unit and controls the terminals served by the N first radio frequency units to resume the uplink data transmission. In this embodiment, when a new radio frequency unit is accessed, the BBU suspends uplink data transmission performed by terminals served by the accessed radio frequency units. When the new radio frequency unit is accessed, the accessed radio frequency units may not need to buffer uplink data transmitted by the terminal, so that a risk of data loss caused by data buffering can be reduced, and a risk of service damage can be reduced, thereby ensuring communication quality to some extent.

In a possible implementation, the BBU may stop allocating the radio resources used for data transmission between the N first radio frequency units and the terminal to the N first radio frequency units, to control the terminals served by the N first radio frequency units to suspend uplink data transmission; and the BBU may reallocate the radio resources used for data transmission between the N first radio frequency units and the terminal to the N first radio frequency units, to control the terminals served by the N first radio frequency units to resume uplink data transmission. In the foregoing implementation, when the new radio frequency unit is accessed, the BBU stops allocating radio resources to the accessed radio frequency units, because the terminals served by the accessed radio frequency units have no available radio resources, the terminals cannot send uplink data during access of the new radio frequency unit. Therefore, the accessed radio frequency units do not need to buffer data, so that the risk of data loss caused by data buffering can be reduced, and the risk of service damage can be reduced, thereby ensuring communication quality to some extent. After the new radio frequency unit is accessed, the BBU reallocates radio resources to the accessed radio frequency units. Therefore, after the new radio frequency unit is accessed, the terminal may send uplink data by using the allocated radio resources.

In a possible implementation, the BBU may determine that the second radio frequency unit is ready for access when receiving a notification message sent by a network management device to which the BBU belongs, where the notification message is used to notify the BBU that the second radio frequency unit is already configured. In the foregoing implementation, because the radio frequency unit is not frequently added or deleted, compared with a manner in which the BBU periodically interrupts uplink services of all accessed radio frequency units to enable access of the new radio frequency unit, in this embodiment, the BBU suspends uplink data transmission of the accessed radio frequency units when determining that the new radio frequency unit needs to be accessed. This can reduce interruption frequency of the radio frequency unit, thereby reducing the transmission delay of the radio frequency unit.

According to a first aspect, the embodiments provide a communications apparatus. The communications device is a baseband unit or a chip in a BBU. The communications apparatus includes: a processing module, configured to allocate radio resources used for data transmission between N first radio frequency units and a terminal to the N first radio frequency units connected to the baseband unit, where N is an integer greater than 0; and allocate, based on the radio resources of the N first radio frequency units, the bandwidth resources used for data transmission between the BBU and the N first radio frequency units to the N first radio frequency units.

In a possible implementation, when allocating, based on the radio resources of the N first radio frequency units, the bandwidth resources used for data transmission between the BBU and the N first radio frequency units to the N first radio frequency units, the processing module may be configured to: determine bandwidth demand amounts of the N first radio frequency units based on the radio resources of the N first radio frequency units, and allocate a bandwidth resource to the $N^{th}$ first radio frequency unit based on the bandwidth demand amounts of the $N^{th}$ first radio frequency unit.

In a possible implementation, when allocating the bandwidth resource to the $N^{th}$ first radio frequency unit based on the bandwidth demand amounts of the $N^{th}$ first radio frequency unit, the processing module may be configured to: if a sum of the bandwidth demand amounts of the N first radio frequency units is not greater than a total amount of bandwidth resources of the BBU, allocate a bandwidth resource satisfying the bandwidth demand amounts to the $N^{th}$ first radio frequency unit; or if a sum of the bandwidth demand amounts of the N first radio frequency units is greater than a total amount of bandwidth resources of the baseband unit, reduce the radio resources of the $N^{th}$ first radio frequency unit according to a preset rule, and allocate a bandwidth resource to the $N^{th}$ first radio frequency unit based on radio resources of the $N^{th}$ first radio frequency unit obtained after the reduction.

In a possible implementation, when reducing the radio resources of the $N^{th}$ first radio frequency unit according to the preset rule, the processing module may be configured to: reduce the radio resources of the N first radio frequency units by a first quantity of radio resources; or reduce radio resources of all user services provided by the $N^{th}$ first radio frequency unit by a second quantity of radio resources; or for each user service provided by the $N^{th}$ first radio frequency unit, reduce radio resources of the user service by a third quantity of radio resources based on a priority of the user service.

In a possible implementation, when allocating the radio resources used for data transmission between the N first radio frequency units and the terminal to the N first radio frequency units connected to the baseband unit, the processing module may be configured to: allocate, for all user services under the $N^{th}$ first radio frequency unit, the radio resources used for data transmission between the N first radio frequency units and the terminal to the $N^{th}$ first radio frequency unit.

In a possible implementation, the processing module may further be configured to: determine that a second radio frequency unit is ready for access; control terminals served by the N first radio frequency units to suspend uplink data transmission; access the second radio frequency unit; and control the terminals served by the N first radio frequency units to resume uplink data transmission.

In a possible implementation, when controlling the terminals served by the N first radio frequency units to suspend uplink data transmission, the processing module may be configured to: stop allocating the radio resources used for data transmission between the N first radio frequency units and the terminal to the N first radio frequency units. When controlling the terminals served by the N first radio frequency units to resume uplink data transmission, the processing module may be configured to: reallocate the radio resources used for data transmission between the N first radio frequency units and the terminal to the N first radio frequency units.

In a possible implementation, the communications apparatus further includes a transceiver module. The transceiver module may be configured to receive a notification message sent by a network management device to which the baseband unit belongs, where the notification message is used to notify the baseband unit that the second radio frequency unit is already configured. When determining that the second radio frequency unit is ready for access, the processing module may be configured to: when the transceiver module receives the notification message, determine that the second radio frequency unit is ready for access.

According to a third aspect, a BBU is provided. The BBU includes a processor, a communications interface, and a memory. The communications interface is configured to transmit a message and/or data between the apparatus and another apparatus. The memory is configured to store a computer executable instruction, and when the apparatus runs, the processor executes the computer executable instruction stored in the memory, so that the apparatus performs the bandwidth scheduling method according to any one of the first aspect or the possible implementations of the first aspect mentioned above.

According to a fourth aspect, the embodiments further provide a network side device. The network side device includes the BBU according to the second aspect or any embodiment of the second aspect, and N radio frequency units connected to the BBU, where N is an integer greater than 0.

According to a fifth aspect, the embodiments further provide a computer-readable storage medium. The computer-readable storage medium stores an instruction, and when the instruction is run on a computer, the computer is enabled to perform the method according to the foregoing aspects.

According to a sixth aspect, the embodiments further provide a computer program product including an instruction. When the computer program product runs on a computer, the computer is enabled to perform the method according to the foregoing aspects.

DETAILED DESCRIPTION OF THE EMBODIMENTS

To make objectives, technical solutions, and advantages of the embodiments clearer, the following further describes the embodiments in detail with reference to the accompanying drawings.

Currently, a distributed base station is becoming a mainstream mode of a base station device. A baseband processing unit or base band unit) (BBU) and a radio remote unit (RRU) are connected through an optical fiber. One BBU may support a plurality of RRUs. The distributed base station architecture features small size, low power consumption, flexible installation, fast deployment, and the like. It can meet application requirements of different capacities and scenarios.

Figure 1:
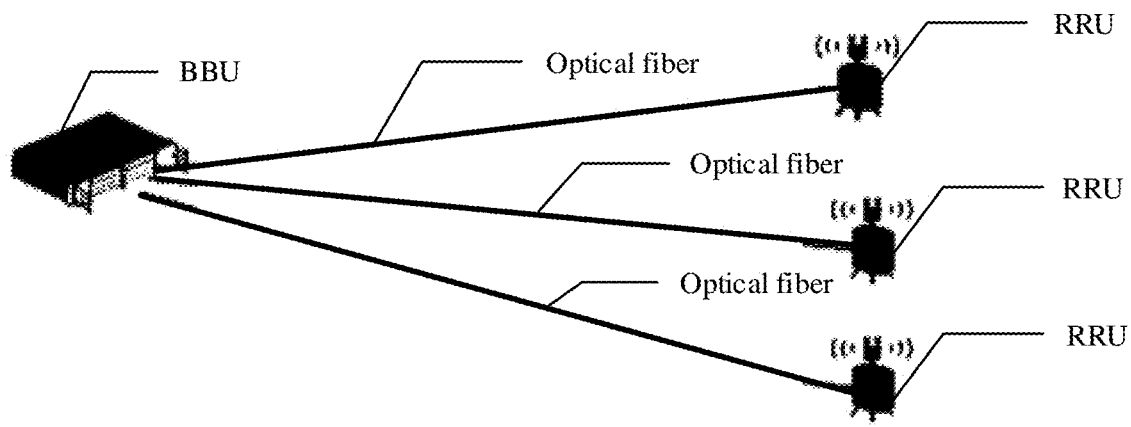
FIG. 1 is a schematic architectural diagram of a base station according to the embodiments.

The RRUs and the BBU are connected through optical fibers. Each RRU is connected to the BBU through an optical fiber, as shown in FIG. 1. In this manner, as the density of the RRUs increases, more and more optical fiber resources are used, and it is increasingly difficult to deploy the RRUs. In addition, when each RRU is connected to the BBU by using one optical fiber resource, the BBU allocates a same bandwidth resource to the RRU. However, traffic volumes of the RRUs may be different. Therefore, limited by the bandwidth resource, an RRU with a large traffic volume may cause relatively poor user experience. However, an RRU with a small traffic volume may waste the allocated bandwidth resource.

Figure 2:
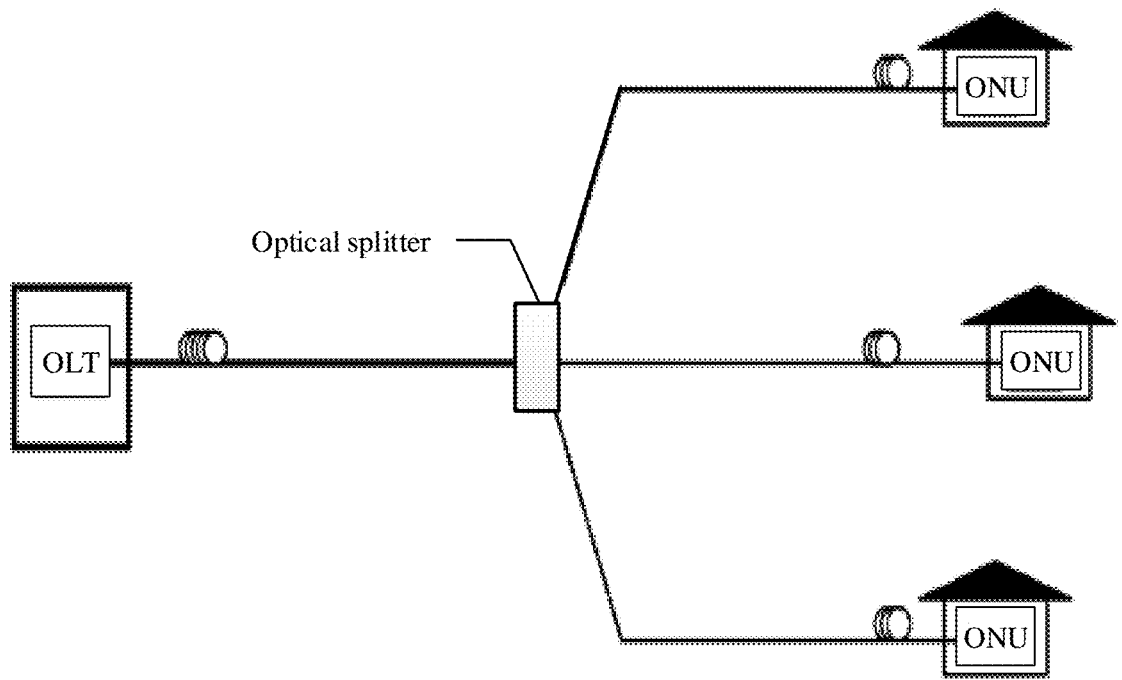
FIG. 2 is a schematic architectural diagram of a PON network according to the embodiments.
Figure 3:
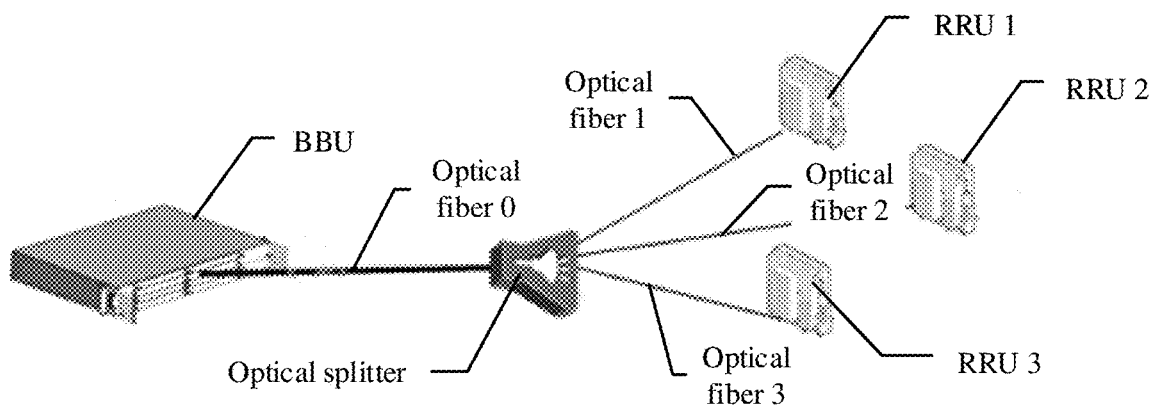
FIG. 3 is a schematic architectural diagram of a base station deployed based on a PON network structure according to the embodiments.

To resolve this problem, a base station may be deployed with reference to a passive optical network (PON) network architecture. A PON network mainly includes an optical line terminal (OLT) installed in a central control station, an optical splitter, and a plurality of optical network units (ONU) installed in a user place. As shown in FIG. 2, the OLT is connected to the plurality of ONUs by using the optical splitter. Therefore, when the BBU is deployed with reference to the PON network architecture, the BBU may be connected to the plurality of RRUs by using the optical splitter, as shown in FIG. 3.

Figure 4A:
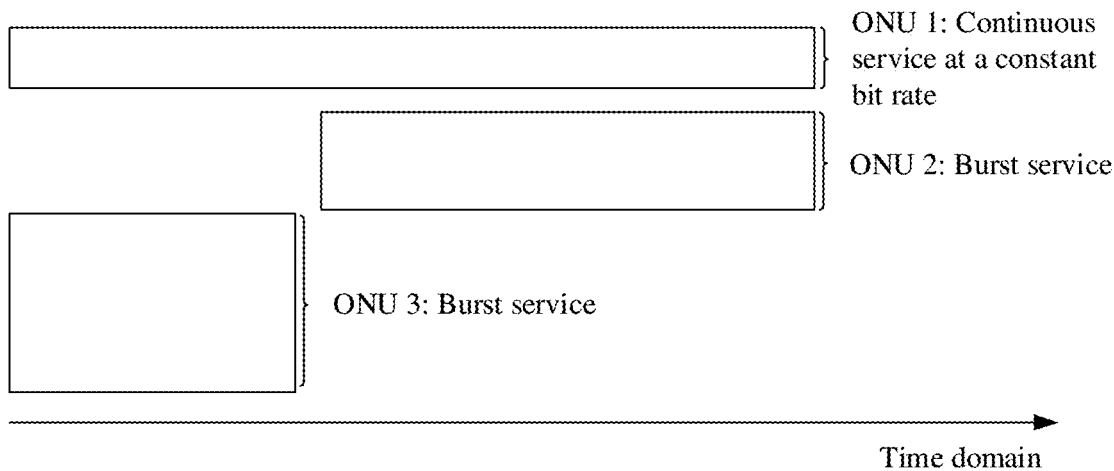
FIG. 4A is a schematic diagram of bandwidth resources required by an ONU 1, an ONU 2, and an ONU 3 according to the embodiments.
Figure 4B:
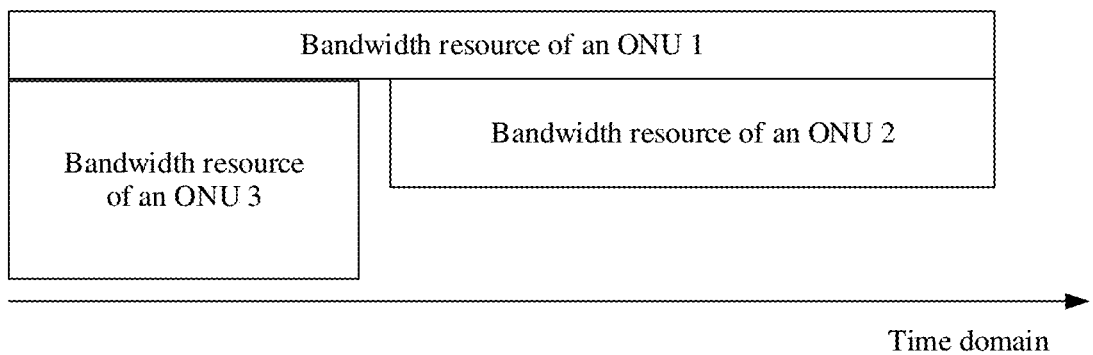
FIG. 4B is a schematic diagram in which an OLT dynamically allocates bandwidth resources to an ONU 1, an ONU 2, and an ONU 3 according to the embodiments.

If the base station is deployed based on the PON network architecture, for a communication method between the BBU and the RRUs, refer to a communication method between the OLT and the ONUs. During uplink data transmission, the OLT communicates with each ONU through time division multiple access (TDMA). For example, the OLT allocates a bandwidth resource to each ONU based on a bandwidth resource required by the ONU, so that the ONU transmits uplink data on the allocated bandwidth resource. An ONU 1, an ONU 2, and an ONU 3 are used as an example. Bandwidth resources required by the ONU 1, the ONU 2, and the ONU 3 are shown in FIG. 4A. The OLT allocates bandwidth resources to the ONU 1, the ONU 2, and the ONU 3 based on the bandwidth resources required by the ONU 1, the ONU 2, and the ONU 3, as shown in FIG. 4B. Therefore, the ONU 1 transmits uplink data on a first resource, the ONU 2 transmits uplink data on a second resource, and the ONU 3 transmits uplink data on a third resource. Therefore, the BBU may also allocate a bandwidth resource to each RRU based on a bandwidth resource required by the RRU, so that the RRU may send an uplink signal on the bandwidth resource allocated to the RRU. However, bandwidth resources of the PON network are limited. When the BBU is connected to a relatively large quantity of RRUs, or there are a relatively large quantity of UE services provided by the RRUs, the bandwidth resources of the PON network may be insufficient. Consequently, some RRUs cannot obtain bandwidth scheduling, a transmission delay of the RRUs is relatively long, and user experience is affected.

In view of this, the embodiments provide a bandwidth scheduling method and an apparatus to resolve a problem in the prior art that a transmission delay is relatively large and user experience is relatively poor when a BBU and an RRU are networked by using a PON network. The method and the apparatus are based on a same concept. Because a problem-resolving principle of the method is similar to that of the apparatus, implementations of the apparatus and the method may mutually refer to each other. No repeated description is provided.

The term "a plurality of" mentionedbelow in the embodiments means two or more than two.

In addition, it should be understood that, in descriptions of the embodiments, terms such as "first" and "second" are merely used for differentiation and description, but cannot be understood as an indication or implication of relative importance or an indication or implication of an order.

The following describes in detail the bandwidth scheduling method provided in the embodiments with reference to the accompanying drawings. The bandwidth scheduling method provided in this embodiment may be used in a base station. The base station includes a BBU and a plurality of radio frequency units. The BBU may include a plurality of interfaces. An interface in the BBU may be a common public radio interface (CPRI), or may be an ethernet common public radio interface (eCPRI). A type of the interface in the BBU is not limited herein in this embodiment. One interface of the BBU may be connected to N radio frequency units by using an optical splitter. For example, when N is equal to 3, for a structure of the base station, refer to FIG. 3. The BBU performs bandwidth scheduling on the N radio frequency units to run user services provided by the N radio frequency units. The BBU may use the bandwidth scheduling method provided in this embodiment for each interface.

To better understand the embodiments, the following describes a bandwidth scheduling process provided in the embodiments with reference to a specific application scenario. A base station shown in FIG. 3 is used as an example. The base station includes a BBU and three first radio frequency units connected to an interface of the BBU. The baseband unit is a BBU, and the three first radio frequency units are an RRU 1, an RRU 2, and an RRU 3, as shown in FIG. 3. FIG. 3 is a schematic architectural diagram of the base station. FIG. 3 is only a schematic diagram, and a quantity, a type, and the like of devices included in the base station are not limited.

Figure 5:
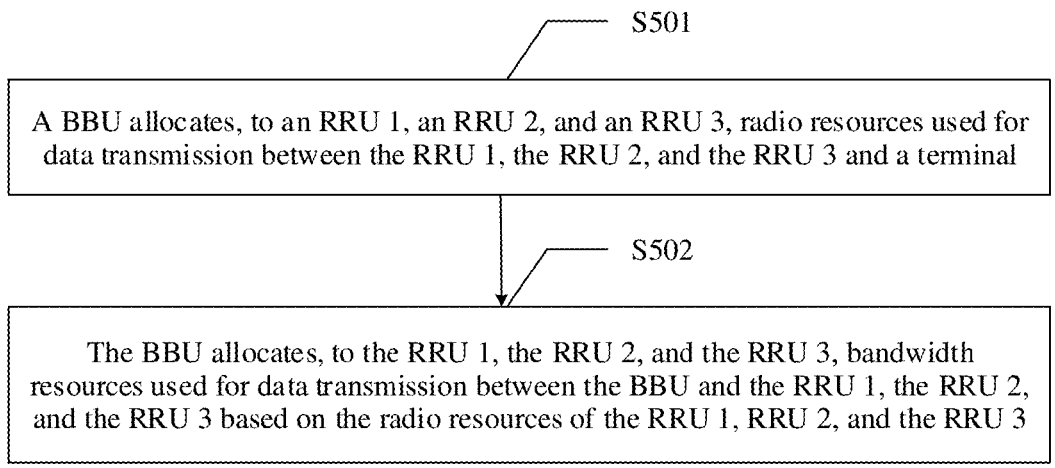
FIG. 5 is a schematic flowchart of a bandwidth scheduling method according to the embodiments.

The BBU performs bandwidth scheduling on the RRU 1, the RRU 2, and the RRU 3 in each scheduling period. FIG. 5 shows a process in which the BBU performs bandwidth scheduling on the RRU 1, the RRU 2, and the RRU 3 in a current scheduling period. The scheduling period in this embodiment may be 1 microsecond, 2 microseconds, 1 millisecond, 3 milliseconds, and the like. Additionally, the scheduling period may be any other duration. Duration of the scheduling period is not limited herein in this embodiment.

S501. The BBU allocates, to the RRU 1, the RRU 2, and the RRU 3, radio resources used for data transmission between the RRU 1, the RRU 2, and the RRU 3, and a terminal. Thus, the BBU may determine UE services provided by the RRU 1, the RRU 2, and the RRU 3 in the current scheduling period, and then allocate a radio resource to each RRU based on a UE service provided by the RRU.

The BBU may determine a UE service provided by any RRU in the current scheduling period in the following manner: The BBU receives a service application sent by UE served by the RRU, determines that a UE service corresponding to the service application runs in the current scheduling period, and therefore, the BBU determines that the UE service provided by the RRU in the current scheduling period includes the UE service corresponding to the service application. Alternatively, when determining that a UE service that is run by the RRU in a previous scheduling period continues to run in the current scheduling period, the BBU determines that the UE service provided by the RRU in the current scheduling period includes the UE service.

For example, when receiving a call service request initiated by a user served by the RRU 1, the BBU determines that the call service is executed in the current scheduling period, and the BBU may determine that a UE service provided by the RRU 1 in the current scheduling period includes one call service. Alternatively, when determining that a call service that is run by the RRU 1 in the previous scheduling period continues to run in the current scheduling period, the BBU determines that the UE service provided by the RRU 1 in the current scheduling period includes the call service.

In a possible implementation, the BBU may allocate a radio resource to the RRU 1 by using steps A1 and A2:

A1. The BBU may determine a radio resource demand amount of each UE service provided by the RRU 1. The radio resource demand amount of each UE service may be preconfigured in the BBU, or may be determined by the BBU based on historical experience. For example, to ensure desirable call quality, a communication service needs a 4G-bit radio resource. Therefore, the radio resource demand amount of the communication service may be 4G bits. Alternatively, the radio resource demand amount of each UE service may be determined in another manner. A manner of determining the radio resource demand amount of each UE service is not limited herein in this embodiment.

A2. The BBU may allocate a radio resource that meets the radio resource demand amount to each UE service provided by the RRU 1.

For example, the UE service provided by the RRU 1 is a call service. A process in which the BBU allocates a radio resource to the RRU 1 may be as follows: The BBU may determine that a radio resource demand amount of the call service is 4G bits, and the BBU allocates a 4G-bit radio resource to the call service provided by the RRU 1.

For a process in which the BBU allocates radio resources to the RRU 2 and the RRU 3, refer to step A1 and step A2. Details are not described herein again in this embodiment.

S502. The BBU allocates, to the RRU 1, the RRU 2, and the RRU 3, bandwidth resources used for data transmission between the BBU and the RRU 1, the RRU 2, and the RRU 3 based on the radio resources of the RRU 1, RRU 2, and the RRU 3. Thus, the BBU may determine bandwidth demand amounts of the RRU 1, the RRU 2, and the RRU 3 based on the radio resources allocated to the RRU 1, the RRU 2, and the RRU 3 and duration of the current scheduling period, and then allocate available bandwidth resources in the current scheduling period to the RRU 1, the RRU 2, and the RRU 3 based on the bandwidth demand amounts of the RRU 1, the RRU 2, and the RRU 3. For example, the BBU allocates a 4 KB radio resource to the RRU 1, and the current scheduling period is 2 microseconds. Therefore, the BBU may determine that a bandwidth demand amount of the RRU 1 in the current scheduling period is 4 KB/2 µs, which is about 1.9 Gbps. Therefore, the BBU may allocate a bandwidth resource of 1.9 Gbps to the RRU 1.

In a PON network, when allocating bandwidth to an ONU, an OLT first needs the ONU to report buffer information, and then the OLT allocates a bandwidth resource to the ONU based on the buffer information reported by the ONU. Therefore, based on a bandwidth allocation mechanism of the OLT, a process in which the BBU allocates bandwidth to an RRU is: The RRU reports a bandwidth demand, then the BBU allocates a bandwidth resource to the ONU based on the bandwidth demand reported by the RRU. However, in this manner, it takes a relatively long time for the BBU to allocate a bandwidth resource to the RRU, resulting in a relatively long transmission delay of the RRU. However, in this embodiment, the BBU allocates a radio resource to the RRU. Therefore, the BBU can accurately learn a bandwidth demand of the RRU, and the BBU can directly allocate a bandwidth resource to each RRU based on the bandwidth demand corresponding to the RRU, without a need of the RRU to report a bandwidth demand of the RRU, so that time consumed in a bandwidth allocation process can be reduced, thereby reducing a transmission delay of the RRU.

Further, when allocating bandwidth resources that can be used in the current scheduling period to the RRU 1, the RRU 2, and the RRU 3 based on the bandwidth demand amounts of the RRU 1, the RRU 2, and the RRU 3, the BBU may allocate bandwidth resources to the RRU 1, the RRU 2, and the RRU 3 based on the bandwidth demands of the RRU 1, the RRU 2, and the RRU 3 and bandwidths of interfaces accessed by the RRU 1, the RRU 2, and the RRU 3. Thus, if a sum of the bandwidth demand amounts of the RRU 1, the RRU 2, and the RRU 3 is not greater than a total amount of bandwidth resources of the interfaces accessed by the RRU 1, the RRU 2, and the RRU 3, the BBU may allocate a bandwidth resource that meets the bandwidth demand amounts to the RRU 1, the RRU 2, and the RRU 3; or if a sum of the bandwidth demand amounts of the RRU 1, the RRU 2, and the RRU 3 is greater than a total amount of bandwidth resources of the interfaces accessed by the RRU 1, the RRU 2, and the RRU 3, the BBU may reduce radio resources of the three RRUs according to a preset rule, so that the bandwidth demand amounts of the three RRUs are not greater than the total amount of bandwidth resources of the interfaces accessed by the RRU 1, the RRU 2, and the RRU 3.

That the BBU reduces radio resources of the three RRUs according to the preset rule may be implemented in the following manner.

Manner 1: The BBU reduces the radio resources of the RRU 1, the RRU 2, and the RRU 3 by a first quantity of radio resources. For example, the total amount of bandwidth resources of the interfaces accessed by the RRU 1, the RRU 2, and the RRU 3 is 10 Gbps. It is assumed that a scheduling period is 1 s, and a radio resource of the RRU 1 is 6 Gbits. In this way, a bandwidth demand amount of the RRU 1 is 6 G/1s=6 Gbps. If a radio resource of the RRU 2 is 5 Gbits, a bandwidth demand of the RRU 2 is 5 G/1s=5 Gbps. If a radio resource of the RRU 3 is 2 Gbits, a bandwidth demand of the RRU 3 is 2 G/1s=2 Gbps. It can be learned that a sum of the bandwidth demands of the RRU 1, the RRU 2, and the RRU 3 is 13 Gbps, which exceeds the total amount of bandwidth resources of the interfaces accessed by the RRU 1, the RRU 2, and the RRU 3. Therefore, the BBU reduces the radio resources of the RRU 1, the RRU 2, and the RRU 3 by 1 Gbit. If a radio resource of the RRU 1 obtained after the reduction is 5 Gbits, a bandwidth demand amount corresponding to the radio resource of the RRU 1 obtained after the reduction is 5 G/1s=5 Gbps. If a radio resource of the RRU 2 obtained after the reduction is 4 Gbits, a bandwidth demand amount corresponding to the radio resource of the RRU 2 obtained after the reduction is 4 G/1s=4 Gbps. If a radio resource of the RRU 3 obtained after the reduction is 1 Gbits, a bandwidth demand amount corresponding to the radio resource of the RRU 3 obtained after the reduction is 1 G/1s=1 Gbps. After the radio resource is reduced, the sum of the bandwidth demand amounts of the RRU 1, the RRU 2, and the RRU 3 is 10 Gbps. It can be learned that the total amount of bandwidth resources of the interfaces accessed by the RRU 1, the RRU 2, and the RRU 3 may meet the bandwidth demand amounts of the RRU 1, the RRU 2, and the RRU 3 after adjustment.

Manner 2: The BBU reduces the radio resources of all UE services provided by the RRU 1, the RRU 2, and the RRU 3 by a second quantity of radio resources. Because a radio resource of a UE service decrease, a bandwidth demand amount of the RRU decreases. Therefore, the BBU allocates a bandwidth resource to the RRU based on the bandwidth demand amount of the RRU obtained after the reduction, so that a sum of bandwidth demand amounts of the three RRUs is not greater than the total amount of bandwidth resources of the interfaces accessed by the RRU 1, the RRU 2, and the RRU 3. For example, a total amount of bandwidth resources of the BBU is 10 Gbps. It is assumed that a scheduling period is 1 s, a UE service provided by the RRU 1 includes a first service and a second service, a radio resource of the first service is 3 Gbits, a radio resource of the second service is 2 Gbits, and a radio resource of the RRU 1 is 5 Gbits. In this way, a bandwidth demand amount of the RRU 1 is 5 G/ls=5 Gbps. A UE service provided by the RRU includes a third service, a radio resource of the third service is 4 Gbits, and a radio resource of RRU 2 is 4 Gbits. In this way, a bandwidth demand amount of the RRU 2 is 4 G/ls=4 Gbps. A UE service provided by the RRU 3 includes a fourth service, a radio resource of the fourth service is 2 Gbits, and a radio resource of RRU 3 is 2 Gbits. In this way, a bandwidth demand amount of the RRU 3 is 2 G/ls=2 Gbps. It can be understood that a sum of the bandwidth demands of the RRU 1, the RRU 2, and the RRU 3 is 11 Gbps, which exceeds the total amount of bandwidth resources of the interfaces accessed by the RRU 1, the RRU 2, and the RRU 3. Therefore, the BBU reduces the radio resources of the first service to the fourth service by 0.25 Gbits, a radio resource of the first service obtained after the reduction is 2.75 Gbits, and a radio resource of the second service obtained after the reduction is 1.75 Gbits. Therefore, a radio resource of the RRU 1 obtained after the reduction is 4.5 Gbits, so that a bandwidth demand amount of the RRU 1 is 4.5 Gbps after the radio resource is reduced. If a radio resource of the third service obtained after the reduction is 3.75 Gbits, a radio resource of the RRU 2 obtained after the reduction is 3.75 Gbits. In this way, a bandwidth demand amount of the RRU 2 is 3.75 Gbps after the radio resource is reduced. If a radio resource of the fourth service obtained after the reduction is 1.75 Gbits, a radio resource of the RRU 3 obtained after the reduction is 1.75 Gbits. In this way, a bandwidth demand amount of the RRU 3 is 1.75 Gbps after the radio resource is reduced. In this case, the sum of the bandwidth demand amounts of the RRU 1, the RRU 2, and the RRU 3 is 10 Gbps. It can be understood that the total amount of bandwidth resources of the interfaces accessed by the RRU 1, the RRU 2, and the RRU 3 may meet the bandwidth demands of the RRU 1, the RRU 2, and the RRU 3 after adjustment.

Manner 3: For each user service provided by the RRU 1, the RRU 2, and the RRU 3, the BBU reduces radio resources of the user service by a third quantity of radio resources based on a priority of the user service. Therefore, the BBU may sort UE services in descending order of priorities. A UE service with a higher priority is reduced by fewer radio resources, and a UE service with a lower priority is reduced by more radio resources. Alternatively, the BBU may reduce a radio resource of a UE service with a relatively low priority. Because a quantity of radio resources of the UE services provided by the RRU 1, the RRU 2, and the RRU 3 decreases, the bandwidth demand amounts of the RRU 1, the RRU 2, and the RRU 3 decrease. Therefore, the bandwidth resources allocated by the BBU to the RRU 1, the RRU 2, and the RRU 3 decrease, so that the sum of bandwidth demand amounts of the RRU 1, the RRU 2, and the RRU 3 is not greater than a bandwidth resource of the BBU. For example, the bandwidth resource of the BBU is 10 Gbps. It is assumed that a UE service provided by the RRU 1 includes a first service and a second service, a radio resource of the first service is 3 Gbits, a radio resource of the second service is 2 Gbits, and a radio resource of the RRU 1 is 5 Gbits. In this way, a bandwidth demand of the RRU 1 is 5 Gbps. A UE service provided by the RRU 2 includes a third service, a radio resource of the third service is 4 Gbits, and a radio resource of RRU 2 is 4 Gbits. In this way, a bandwidth demand of the RRU 2 is 4 Gbps. A UE service provided by the RRU 3 includes a fourth service, a radio resource of the fourth service is 2 Gbits, and a radio resource of RRU 3 is 2 Gbits. In this way, a bandwidth demand of the RRU 3 is 2 Gbps. It can be understood that a sum of the bandwidth demands of the RRU 1, the RRU 2, and the RRU 3 is 11 Gbps, which exceeds the total amount of bandwidth resources of the interfaces accessed by the RRU 1, the RRU 2, and the RRU 3. Therefore, the BBU reduces the radio resource of the third service by 1 Gbit, a radio resource of the third service obtained after the reduction is 3 Gbits, and a radio resource of the RRU 2 obtained after the reduction is 3 Gbits, so that a bandwidth demand of the RRU 2 is 3 Gbps after the radio resource is reduced. In this case, the sum of the bandwidth demands of the RRU 1, the RRU 2, and the RRU 3 is 10 Gbps. It can be understood that the total amount of bandwidth resources of the interfaces accessed by the RRU 1, the RRU 2, and the RRU 3 may meet the bandwidth demands of the RRU 1, the RRU 2, and the RRU 3 after adjustment.

In the foregoing three manners, when bandwidth resources of the BBU are insufficient, a bandwidth demand of the RRU is reduced by reducing radio resources allocated to the RRU, and then the total amount of bandwidth resources of the BBU can meet a bandwidth demand of each RRU, so that the RRU can obtain bandwidth scheduling. In this manner, the BBU side does not form a buffer when the RRU cannot obtain bandwidth scheduling, thereby reducing the transmission delay of the RRU.

In this embodiment, the BBU side controls bandwidth demand amounts of the RRUs by allocating radio resources to the RRUs, so that the RRUs can share a bandwidth resource while a transmission delay is reduced, thereby improving bandwidth utilization of each RRU.

If an interface that is in the BBU and that is connected to the RRU 1, the RRU 2, and the RRU 3 shown in FIG. 3 is ready to access a second radio frequency unit, that is, an RRU 4, when determining that the RRU 4 is ready to access the interface connected to the RRU 1, the RRU 2, and the RRU 3, the BBU may control a terminal served by the RRU 1, the RRU 2, and the RRU 3 to suspend uplink data transmission. Then, the BBU connects the RRU 4 to the interface connected to the RRU 1, the RRU 2, and the RRU 3, that is, the BBU may perform ranging, registration, and the like on the RRU 4. After the BBU is successfully connected to the RRU 4, the BBU controls the terminal served by the RRU 1, the RRU 2, and the RRU 3 to resume uplink data transmission.

In an implementation, before the RRU 4 is ready for access, a network management device of the BBU may configure a frequency band, a frequency bandwidth, and the like for the RRU 4. After completing configuration for the RRU 4, the network management device may send a notification message to the BBU, to notify the BBU that the RRU 4 is already configured. Therefore, the BBU determines that the RRU 4 is to access the interface connected to the RRU 1, the RRU 2, and the RRU 3.

Further, the BBU may control the terminal served by the RRU 1, the RRU 2, and the RRU 3 to suspend uplink data transmission, by stopping allocating, to the RRU 1, the RRU 2, and the RRU 3, radio resources used for data transmission between the RRU 1, the RRU 2, and the RRU 3 and the terminal. After the BBU is successfully connected to the RRU 4, the BBU may control the terminals served by the N first radio frequency units to resume uplink data transmission, by reallocating, to the RRU 1, the RRU 2, and the RRU 3, radio resources used for data transmission between the RRU 1, the RRU 2, and the RRU 3 and the terminal.

In a PON network, the OLT sets a periodic interrupt slot, and the OLT interrupts an uplink service that has accessed an ONU when the interrupt slot arrives, so that a to-be-accessed ONU may access the OLT in the interrupt slot, but an optical network terminal (ONT) served by the accessed ONU in the interrupt slot is still sending uplink data. Therefore, the ONU needs to buffer the uplink data sent by the ONT in the interrupt slot. Therefore, based on an ONU access mechanism in the PON network, a process in which the BBU accesses a new RRU is as follows: the BBU periodically interrupts an uplink service of an accessed RRU, so that the new RRU can access the BBU during any interruption period, and the RRU buffers uplink data sent by the UE during the interruption period. However, a manner in which the RRU buffers the uplink data sent by the UE during the interruption increases a risk of data loss, increases a risk of service loss, and affects communication quality. In this embodiment, the BBU suspends uplink data transmission of the accessed RRU by stopping allocating a radio resource to the accessed RRU when a new RRU is accessed. Because the UE service provided by the RRU has no available radio resource, the UE cannot send uplink data during the interruption period, so that the risk of data loss caused by data buffering can be reduced, and the risk of service damage can be reduced, thereby ensuring communication quality to some extent.

In addition, because the RRU is different from a common ONU, and is not frequently added or deleted, compared with a manner in which the BBU periodically interrupts uplink services of all accessed RRUs to enable access of the new RRU, in this embodiment, the BBU suspends uplink data transmission of the RRU when determining that the new RRU needs to be accessed. This can reduce interruption frequency of the RRU, thereby reducing the transmission delay of the RRU.

Figure 6:
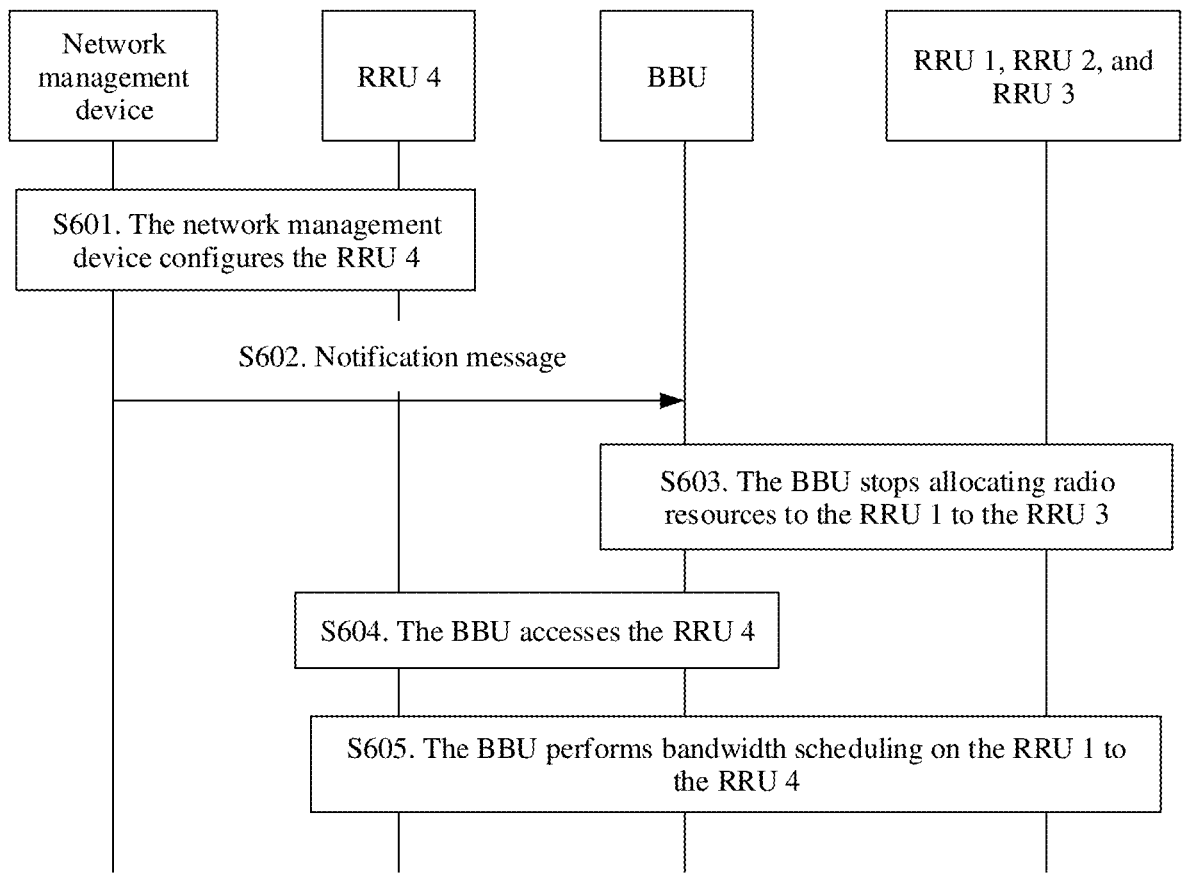
FIG. 6 is a schematic diagram of an access process of a radio frequency unit according to the embodiments.

For example, for an access process of the RRU 4, refer to FIG. 6.

S601. A network management device to which a base station belongs configures a frequency band, a frequency bandwidth, and the like for the RRU 4.

S602. After completing configuration for the RRU 4, the network management device sends a notification message to a BBU, where the notification message is used to notify the BBU that the RRU 4 is already configured.

S603. After receiving the notification message sent by the network management device, the BBU stops allocating radio resources to UE services provided by an RRU 1, an RRU 2, and an RRU 3, so that the UE stops uplink data transmission.

S604. The BBU accesses the RRU 4. Thus, the BBU may perform access such as ranging and registration on the RRU 4.

S605. After the RRU 4 is accessed, the BBU performs bandwidth scheduling on the RRU 1, the RRU 2, the RRU 3, and the RRU 4. For a process in which the BBU performs bandwidth scheduling on the RRU 1, the RRU 2, the RRU 3, and the RRU 4, refer to the bandwidth scheduling process shown in FIG. 5. Details are not described herein again in this embodiment.

The foregoing describes solutions provided in the embodiments from a perspective of interaction between network elements. It may be understood that to implement the foregoing functions, each network element includes a corresponding hardware structure and/or software module for implementing each function. A person of ordinary skill in the art should easily be aware that, in combination with the examples described in the embodiments disclosed, units and algorithm steps may be implemented by hardware or a combination of hardware and computer software in the embodiments. Whether a function is performed by hardware or hardware driven by computer software depends on particular applications and design constraints of the technical solutions. A person of ordinary skill in the art may use different methods to implement the described functions for each particular application, but it should not be considered that the implementation goes beyond the scope of the embodiments.

Figure 7:
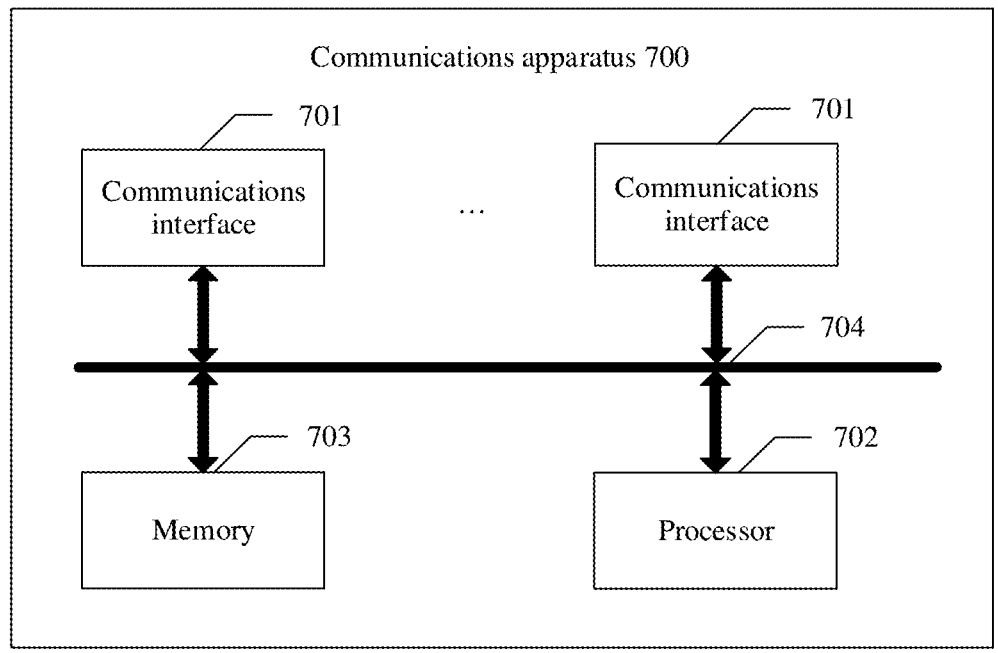
FIG. 7 is a schematic structural diagram of a communications apparatus according to the embodiments.

Based on a same concept, as shown in FIG. 7, an embodiment provides a communications apparatus 700. The communications apparatus 700 may be a BBU or a chip in a BBU and may perform the method performed by the BBU in any one of the foregoing embodiments. The communications apparatus 700 includes at least one communications interface 701, a processor 702, and a memory 703. The communications interface 701 may be a CPRI or may be an eCPRI. The communications interface 701 is configured to transmit data between the BBU and another device. The memory 703 is configured to store a program executed by the processor 702, and the processor 702 controls the execution. The processor 702 is configured to execute the program code stored in the memory 703, to implement the bandwidth scheduling method provided in the foregoing embodiments. The processor 702 is configured to perform operations of the BBU in the methods in the embodiments shown in FIG. 5 and FIG. 6, for example, allocate radio resources used for data transmission between the RRU 1, the RRU 2, and the RRU 3 and the terminal to the RRU 1, the RRU 2, and the RRU 3, and allocate bandwidth resources used for data transmission between the BBU and the RRU 1, the RRU 2, and the RRU 3 to the RRU 1, the RRU 2, and the RRU 3 based on the radio resources of the RRU 1, RRU 2, and RRU 3. For details, refer to the method in the embodiment shown in FIG. 5 or FIG. 6. Details are not described herein again.

The memory 703 may be a read-only memory (ROM) or another type of static storage device that can store static information and instructions, or a random access memory (RAM) or another type of dynamic storage device that can store information and instructions. Alternatively, the memory 703 may be an electrically erasable programmable read-only memory (EEPROM), a compact disc read-only memory (CD-ROM) or another compact disc storage, an optical disc storage (including a compact optical disc, a laser disc, an optical disc, a digital versatile disc (DVD), a Blu-ray disc, and the like), a magnetic disk storage medium or another magnetic storage device, or any other medium that can be configured to carry or store expected program code in a form of an instruction or a data structure and that can be accessed by a computer, but is not limited thereto. The memory may exist independently and is connected to the processor through a communication line. The memory may alternatively be integrated with the processor.

The processor 702 may be a central processing unit (CPU), a microprocessor, an application-specific integrated circuit, a programmable logic circuit, a large-scale integrated circuit, a digital processing unit, and the like.

Optionally, the computer-executable instruction in this embodiment may also be referred to as application program code. This is not limited in this embodiment.

In this embodiment, a specific connection medium between the communications interface 701, the processor 702, and the memory 703 is not limited. In this embodiment, the communications interface 701, the processor 702, and the memory 703 are connected by using a bus 704 in FIG. 7. The bus is represented by using a bold line in FIG. 7. A connection manner of other components is merely schematically described and is not restrictive. The bus may be classified into an address bus, a data bus, a control bus, and the like. For ease of representation, only one thick line is used to represent the bus in FIG. 7, but this does not mean that there is only one bus or only one type of bus.

Figure 8:
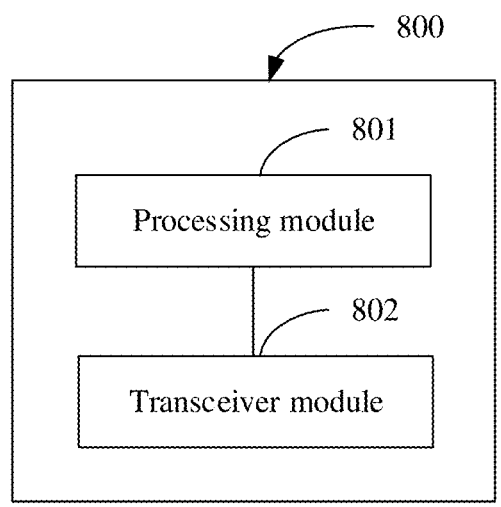
FIG. 8 is a schematic structural diagram of a communications apparatus according to the embodiments.

In the embodiments, function modules in the apparatus may be obtained through division based on the foregoing method examples. For example, the function modules may be obtained through division based on corresponding functions, or two or more functions may be integrated into one processing module. The integrated module may be implemented in a form of hardware, or may be implemented in a form of a software functional module. It should be noted that, in the embodiments, module division is an example, and is merely logical function division. In actual implementation, another division manner may be used. For example, when each function module is obtained through division based on each corresponding function, FIG. 8 is a schematic diagram of an apparatus. The apparatus 800 may be the BBU or the chip in the BBU in the foregoing embodiments. The apparatus 800 includes a processing module 801 and a transceiver module 802. The processing module is configured to allocate radio resources used for data transmission between N first radio frequency units and a terminal to the N first radio frequency units connected to the BBU, where N is an integer greater than 0; and allocate, based on the radio resources of the N first radio frequency units, bandwidth resources used for data transmission between the BBU and the N first radio frequency units to the N first radio frequency units.

In an implementation, when allocating, based on the radio resources of the N first radio frequency units, the bandwidth resources used for data transmission between the BBU and the N first radio frequency units to the N first radio frequency units, the processing module may be configured to: determine bandwidth demand amounts of the N first radio frequency units based on the radio resources of the N first radio frequency units, and allocate the bandwidth resource to the $N^{th}$ first radio frequency unit based on the bandwidth demand amounts of the $N^{th}$ first radio frequency unit.

In an implementation, when allocating the bandwidth resource to the $N^{th}$ first radio frequency unit based on the bandwidth demand amounts of the $N^{th}$ first radio frequency unit, the processing module may be configured to: if a sum of the bandwidth demand amounts of the N first radio frequency units is not greater than a total amount of bandwidth resources of the BBU, allocate a bandwidth resource satisfying the bandwidth demand amounts to the $N^{th}$ first radio frequency unit; or if a sum of the bandwidth demand amounts of the N first radio frequency units is greater than a total amount of bandwidth resources of the BBU, reduce the radio resources of the $N^{th}$ first radio frequency unit according to a preset rule, and allocate a bandwidth resource to the $N^{th}$ first radio frequency unit based on radio resources of the $N^{th}$ first radio frequency unit obtained after the reduction.

In an implementation, when reducing the radio resources of the $N^{th}$ first radio frequency unit according to the preset rule, the processing module may be configured to: reduce the radio resources of the N first radio frequency units by a first quantity of radio resources; or reduce radio resources of all user services provided by the $N^{th}$ first radio frequency unit by a second quantity of radio resources; or for each user service provided by the $N^{th}$ first radio frequency unit, reduce radio resources of the user service by a third quantity of radio resources based on a priority of the user service.

In an implementation, when allocating the radio resources used for data transmission between the N first radio frequency units and the terminal to the N first radio frequency units connected to the BBU, the processing module may be configured to: allocate, for all user services provided by the $N^{th}$ first radio frequency unit, the radio resources used for data transmission between the N first radio frequency units and the terminal to the $N^{th}$ first radio frequency unit.

In an implementation, the processing module may further be configured to determine that a second radio frequency unit is ready for access; control terminals served by the N first radio frequency units to suspend uplink data transmission; access the second radio frequency unit; and control the terminals served by the N first radio frequency units to resume uplink data transmission.

In an implementation, when controlling the terminals served by the N first radio frequency units to suspend uplink data transmission, the processing module may be configured to: stop allocating the radio resources used for data transmission between the N first radio frequency units and the terminal to the N first radio frequency units. When controlling the terminals served by the N first radio frequency units to resume uplink data transmission, the processing module may be configured to: reallocate the radio resources used for data transmission between the N first radio frequency units and the terminal to the N first radio frequency units.

In an implementation, the transceiver module may be configured to receive a notification message sent by a network management device to which the BBU belongs, where the notification message is used to notify the BBU that the second radio frequency unit is already configured. When determining that the second radio frequency unit is ready for access, the processing module may be configured to: when the transceiver module receives the notification message, determine that the second radio frequency unit is ready for access.

Thus, functions/implementation processes of the processing module 801 in FIG. 8 may be implemented by the processor 702 in FIG. 7 by invoking the computer-executable instruction stored in the memory 703. Functions/implementation processes of the transceiver module 802 in FIG. 8 may be implemented by the communications interface 701 in FIG. 7.

An embodiment further provides a computer-readable storage medium, configured to store a computer software instruction that needs to be executed by the foregoing processor. The computer software instruction includes a program that needs to be executed by the foregoing processor.

A person of ordinary skill in the art should understand that the embodiments may be provided as a method, a system, or a computer program product. Therefore, the embodiments may use a form of hardware only embodiments, software only embodiments, or embodiments with a combination of software and hardware. In addition, the embodiments may use a form of a computer program product that is implemented on one or more computer usable storage media (including but not limited to a magnetic disk memory, a CD-ROM, an optical memory, and the like) that include computer usable program code.

is the embodiments are described with reference to the flowcharts and/or block diagrams of the method, the device (system), and the computer program product according to the embodiments. It should be understood that computer program instructions may be used to implement each process and/or each block in the flowcharts and/or the block diagrams and a combination of the process and/or the block in the flowcharts and/or the block diagrams. These computer program instructions may be provided for a general-purpose computer, a dedicated computer, an embedded processor, or a processor of another programmable data processing device to generate a machine, so that the instructions executed by a computer or the processor of the another programmable data processing device generate an apparatus for implementing a specific function in one or more procedures in the flowcharts and/or in one or more blocks in the block diagrams.

These computer program instructions may be stored in a computer-readable memory that can instruct the computer or any other programmable data processing device to work in a specific manner, so that the instructions stored in the computer-readable memory generate an artifact that includes an instruction apparatus. The instruction apparatus implements a specific function in one or more processes in the flowcharts and/or in one or more blocks in the block diagrams.

These computer program instructions may be loaded on the computer or another programmable data processing device, so that a series of operation steps are performed on the computer or another programmable device to produce processing implemented by the computer. Therefore, the instructions executed on the computer or another programmable device provide steps for implementing the specific function in the one or more processes in the flowcharts and/or in the one or more blocks in the block diagrams.

It is clear that a person of ordinary skill in the art can make various modifications and variations to the embodiments without departing from the spirit and scope of the embodiments and the modifications and variations are within the scope of the embodiments.

What is claimed is:

1. A bandwidth scheduling method, comprising:
   allocating, by a baseband unit, radio resources of N first radio frequency units connected to the baseband unit, the radio resources of the N first radio frequency units are used for data transmission between the N first radio frequency units and one or more terminals, wherein N is an integer greater than 0; and
   allocating, by the baseband unit based on the radio resources, bandwidth resources used for data transmission between the baseband unit and the N first radio frequency units to the N first radio frequency units.

2. The method according to claim 1, wherein the allocating, by the baseband unit based on the radio resources, bandwidth resources used for data transmission between the baseband unit and the N first radio frequency units to the N first radio frequency units comprises:
   determining, by the baseband unit based on the radio resources, bandwidth demand amounts of the N first radio frequency units; and
   allocating, by the baseband unit, the bandwidth resource to the $N^{th}$ first radio frequency unit based on the bandwidth demand amounts of the $N^{th}$ first radio frequency unit.

3. The method according to claim 2, wherein the allocating, by the baseband unit, of the bandwidth resource to the $N^{th}$ first radio frequency unit based on the bandwidth demand amounts of the $N^{th}$ first radio frequency unit comprises:
   if a sum of the bandwidth demand amounts of the N first radio frequency units is not greater than a total amount of bandwidth resources of the baseband unit, allocating, by the baseband unit, a bandwidth resource satisfying the bandwidth demand amounts to the $N^{th}$ first radio frequency unit; or
   if a sum of the bandwidth demand amounts of the N first radio frequency units is greater than a total amount of bandwidth resources of the baseband unit, reducing, by the baseband unit, the radio resources of at least one of the $N^{th}$ first radio frequency unit according to a preset rule, and allocating a bandwidth resource to at least one of the $N^{th}$ first radio frequency unit based on radio resources of the $N^{th}$ first radio frequency unit obtained after the reduction.

4. The method according to claim 3, wherein the reducing, by the baseband unit, the radio resources of at least one of the $N^{th}$ first radio frequency unit according to a preset rule comprises:
   reducing, by the baseband unit, the radio resources of the N first radio frequency units by a first quantity of radio resources; or
   reducing, by the baseband unit, radio resources of all terminal services provided by the $N^{th}$ first radio frequency unit by a second quantity of radio resources.

5. The method according to claim 3, wherein the reducing, by the baseband unit, the radio resources of at least one of the $N^{th}$ first radio frequency unit according to a preset rule comprises:
   for each terminal service provided by the $N^{th}$ first radio frequency unit, reducing, by the baseband unit, radio resources of the terminal service by a third quantity of radio resources based on a priority of the terminal service.

6. The method according to claim 1, wherein the allocating, by a baseband unit, radio resources of N first radio frequency units connected to the baseband unit, the radio resources of the N first radio frequency units are used for data transmission between the N first radio frequency units and one or more terminals comprises:
   allocating, by the baseband unit for all terminal services provided by the $N^{th}$ first radio frequency unit, the radio resources.

7. The method according to claim 1, further comprising:
   determining, by the baseband unit, that a second radio frequency unit is ready for access;
   controlling, by the baseband unit, terminals served by the N first radio frequency units to suspend uplink data transmission;
   accessing, by the baseband unit, the second radio frequency unit; and
   controlling, by the baseband unit, the terminals served by the N first radio frequency units to resume the uplink data transmission.

8. The method according to claim 7, wherein the controlling, by the baseband unit, of terminals served by the N first radio frequency units to suspend uplink data transmission comprises:
   stopping, by the baseband unit, allocating the radio resources used for data transmission between the N first radio frequency units and the terminal to the N first radio frequency units; and
   the controlling, by the baseband unit, of the terminals served by the N first radio frequency units to resume the uplink data transmission comprises:
   reallocating, by the baseband unit, the radio resources used for data transmission between the N first radio frequency units and the terminal to the N first radio frequency units.

9. The method according to claim 7, wherein the determining, by the baseband unit, that a second radio frequency unit is ready for access comprises:
   receiving, by the baseband unit, a notification message sent by a network management device to which the baseband unit belongs, wherein the notification message is used to notify the baseband unit that the second radio frequency unit is already configured.

10. A baseband unit, comprising: a processor; and a non-transitory storage medium coupled to the processor and storing executable instructions that, when executed by the processor, cause the baseband unit to:
allocate radio resources of N first radio frequency units connected to the baseband unit, the radio resources of the N first radio frequency units are used for data transmission between the N first radio frequency units and one or more terminals to the N first radio frequency units, wherein N is an integer greater than 0; and
allocate, based on the radio resources, bandwidth resources used for data transmission between the baseband unit and the N first radio frequency units to the N first radio frequency units.

11. The baseband unit according to claim 10, wherein the allocating, based on the radio resources, bandwidth resources used for data transmission between the baseband unit and the N first radio frequency units to the N first radio frequency units comprises:
determining based on the radio resources, bandwidth demand amounts of the N first radio frequency units; and
allocating the bandwidth resource to the $N^{th}$ first radio frequency unit based on the bandwidth demand amounts of the $N^{th}$ first radio frequency unit.

12. The baseband unit according to claim 11, wherein the allocating of the bandwidth resource to the $N^{th}$ first radio frequency unit based on the bandwidth demand amounts of the $N^{th}$ first radio frequency unit comprises:
if a sum of the bandwidth demand amounts of the N first radio frequency units is not greater than a total amount of bandwidth resources of the baseband unit, allocating a bandwidth resource satisfying the bandwidth demand amounts to the $N^{th}$ first radio frequency unit; or
if a sum of the bandwidth demand amounts of the N first radio frequency units is greater than a total amount of bandwidth resources of the baseband unit, reducing the radio resources of at least one of the $N^{th}$ first radio frequency unit according to a preset rule, and allocating a bandwidth resource to at least one of the $N^{th}$ first radio frequency unit based on radio resources of the $N^{th}$ first radio frequency unit obtained after the reduction.

13. The baseband unit according to claim 12, wherein reducing the radio resources of at least one of the $N^{th}$ first radio frequency unit according to a preset rule comprises:
reducing the radio resources of the N first radio frequency units by a first quantity of radio resources; or
reducing radio resources of all terminal services provided by the $N^{th}$ first radio frequency unit by a second quantity of radio resources.

14. The baseband unit according to claim 12, wherein the reducing, by the baseband unit, the radio resources of at least one of the $N^{th}$ first radio frequency unit according to a preset rule comprises:
for each terminal service provided by the $N^{th}$ first radio frequency unit, reducing radio resources of the terminal service by a third quantity of radio resources based on a priority of the terminal service.

15. The baseband unit according to claim 10, wherein the allocating radio resources of N first radio frequency units connected to the baseband unit, the radio resources of the N first radio frequency units are used for data transmission between the N first radio frequency units and one or more terminals comprises:
allocating for all terminal services provided by the $N^{th}$ first radio frequency unit, the radio resources.

16. The baseband unit according to claim 10, wherein the instructions, when executed by the processor, cause the baseband unit to:
determine that a second radio frequency unit is ready for access;
control terminals served by the N first radio frequency units to suspend uplink data transmission;
access the second radio frequency unit; and
control the terminals served by the N first radio frequency units to resume the uplink data transmission.

17. The baseband unit according to claim 16, wherein the controlling of terminals served by the N first radio frequency units to suspend uplink data transmission comprises:
stopping allocating of the radio resources used for data transmission between the N first radio frequency units and the terminal to the N first radio frequency units; and
the controlling of the terminals served by the N first radio frequency units to resume the uplink data transmission comprises:
reallocating the radio resources used for data transmission between the N first radio frequency units and the terminal to the N first radio frequency units.

18. The baseband unit according to claim 16, wherein the determining that a second radio frequency unit is ready for access comprises:
receiving a notification message sent by a network management device to which the baseband unit belongs, wherein the notification message is used to notify the baseband unit that the second radio frequency unit is already configured.

19. A baseband unit, comprising: a processor; and a non-transitory storage medium coupled to the processor and storing executable instructions that, when executed by the processor, cause the baseband unit to:
allocate radio resources of N first radio frequency units connected to the baseband unit, wherein the radio resources are used for data transmission between the N first radio frequency units and one or more terminals to the N first radio frequency units, and the radio resources comprises radio resources of terminal services, wherein N is an integer greater than 0;
if a sum of bandwidth demand amounts of the N radio frequency units is greater than a total amount of bandwidth resources of the baseband unit, reducing radio resources of at least one of the terminal services, based on a priority of the terminal service among a plurality of terminal services; and
allocating a bandwidth resource to the N radio frequency unit based on radio resources obtained after the reduction.

* * * * *